J. A. CHAMBERS.
HAND CAR.
APPLICATION FILED AUG. 9, 1912.
1,048,655.
Patented Dec. 31, 1912.
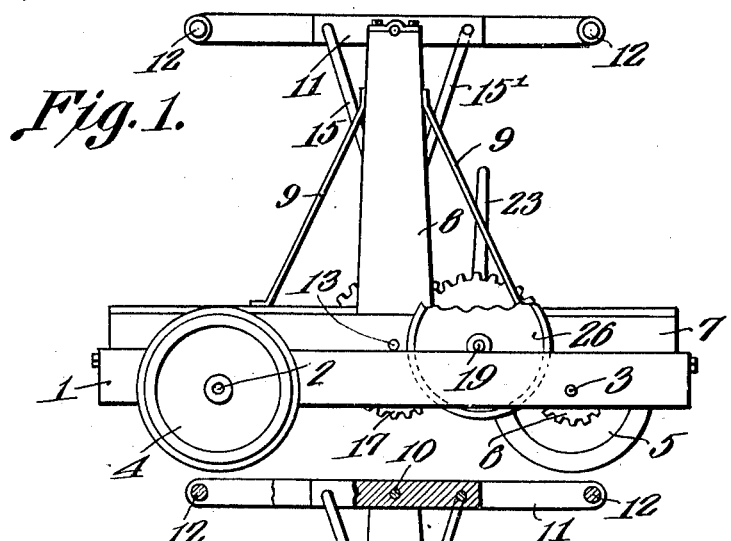
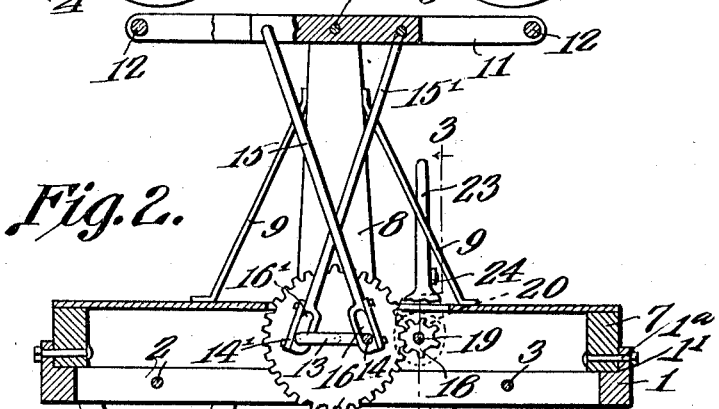
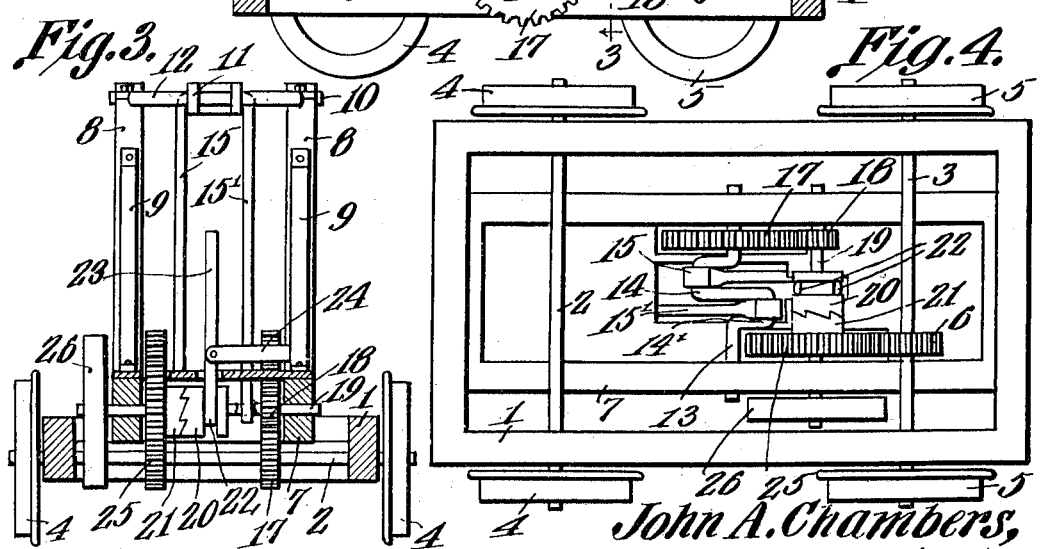
John A. Chambers,
Inventor
by C. A. Snow & Co.
Attorneys

UNITED STATES PATENT OFFICE.

JOHN A. CHAMBERS, OF NEWBURG, MISSOURI, ASSIGNOR OF ONE-HALF TO ALEXANDER B. HALE, OF ROLLA, MISSOURI.

HAND-CAR.

1,048,655.  Specification of Letters Patent.  Patented Dec. 31, 1912.

Application filed August 9, 1912. Serial No. 714,299.

*To all whom it may concern:*

Be it known that I, JOHN A. CHAMBERS, a citizen of the United States, residing at Newburg, in the county of Phelps and State of Missouri, have invented a new and useful Hand-Car, of which the following is a specification.

The present invention relates to improvements in hand cars.

The primary object of the present invention is the provision of a hand car carrying a hand operated walking beam which is disposed to operate a main drive shaft, there being interposed between the main drive shaft and the drive axle of the hand car, a counter shaft provided with a manually controlled clutch device, whereby when the car is coasting the walking beam will not be affected by the drive axle.

A further object of the present invention is the provision of a transmission mechanism controlled by a walking beam and operably disposed with relation to the drive shaft of a hand car to secure the greatest efficiency from the hand actuated mechanism so that the hand car may be operated with the least possible exertion.

A still further object of the present invention is the provision of a frame which carries the main operating mechanism of the present device and which is so constructed as to be readily applied to the frames of the standard hand cars as now used, whereby the wheels and axles and the main frame of such hand cars may be utilized without the necessity of the discarding of the complete used hand car.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a side elevation of the complete car. Fig. 2 is a longitudinal sectional view through the platform and sub-platform showing the connection of the walking beam to the main drive shaft. Fig. 3 is a section taken on lines 3—3 of Fig. 2 with the farther portions of the hand car in elevation. Fig. 4 is a top plan view showing the operating mechanism, the floor of the platform being removed.

Referring to the drawings, the numeral 1 designates the main platform or frame of the hand car which is mounted upon the forward axle 2 and a drive axle 3, the axle 2 being provided with the flanged wheels 4, while the drive axle has keyed thereon the drive wheels 5.

Keyed upon the drive axle 3 within the platform 1 and also within the longitudinal frame pieces of the sub-platform 7 is a gear wheel 6. This sub-platform 7, as clearly shown in Figs. 2 and 4, is readily mounted within and fixedly secured to the main platform of the frame 1 of an ordinary hand car, the same fitting in the recessed portions 1', and held seated therein by the bolts 1ª, so that the mechanism carried by such sub-platform may be connected thereto as a unit and permit of the association of such sub-platform with the wheels and axles of hand cars now in use, so as to permit of the connection therewith of the propelling mechanism hereinafter set forth.

Carried by the sub-platform 7 are the two posts or standards 8 properly braced against longitudinal movement by means of the metal braces 9; and journaled in the upper ends of the post 8 is the shaft 10 upon which is mounted for oscillatory movement the walking beam 11, carrying at its opposite ends the hand grip or handle 21.

Journaled transversely of the frame 7 below and in line with the shaft 10 is a crank shaft 13, provided with the two oppositely disposed cranks 14—14', and in order to operably connect the walking beam 11 to the crank shaft 13, the two rods 15—15' have their upper ends pivotally connected to the walking beam, one upon each side of the shaft 10 while the lower slotted ends 16—16' fit upon the respective cranks 14—14'.

Mounted upon the crank shaft 13 within the frame 7 is a large gear wheel 17, which is in mesh at all times with the small gear or pinion 18 keyed upon the counter shaft 19, said counter shaft 19 being journaled within the frame 7 and in parallel with the crank shaft 13.

The sliding clutch member 20 is mounted upon the shaft 19 and is disposed to engage the freely rotatable member 21, the sliding member being controlled by the forked terminal 22 of the operating lever 23, the operating lever being properly connected to a supporting bracket 24 mounted upon and carried by the frame 7. The rotating clutch member 21 has fixed thereto a large pinion 25 which is in mesh at all times with the gear wheel 6 of the axle.

In order to provide a momentum device for the counter shaft 19, and thereby assist in the operating of the drive axle 3, a fly or balance wheel 26 is keyed to one end of the shaft 19 between the frame 7 and the frame 1.

From the foregoing description, taken in connection with the drawings it is evident that the walking beam 11 may be operated by two persons standing upon the sub-platform 7 and that the reciprocating motion imparted thereto will rotate the crank shaft 13 and through the gears 17 and 18 rotate the counter shaft 19. By means of the clutch 20—21, the counter shaft will transmit motion to the drive axle 3, and by reason of the fly wheel 26, a smooth motion will be imparted to the same while the usual jerky motion imparted to the walking beam 11 will be eased to a great extent.

By reason of the clutch 20—21, the hand car when running down grade may have its drive axle 6 disconnected from the counter shaft so that the walking beam 11 will not be affected and thus endanger the parties riding upon the hand car. It is also evident that the counter shaft may be rotated first to secure a certain momentum before the clutch is thrown in, thus assisting in starting the hand car from a standstill.

What is claimed is:

1. In a hand car, an open rectangular frame constituting a platform, a sub-platform mounted therein and carried thereby, a drive axle, a hand operated walking beam supported by the sub-platform, a main drive shaft journaled in the sub-platform and operably connected to the walking beam, a counter shaft journaled in the sub-platform and operably connected to the main drive shaft, and a manually controlled clutch mounted upon the counter shaft and operably connected to the drive axle, said clutch connecting and disconnecting the counter shaft from the drive axle.

2. In a hand car, an open rectangular frame constituting a platform, a sub-platform mounted therein and carried thereby, a drive axle, a pair of upstanding standards carried by the sub-platform, a hand operated walking beam journaled in the standards, a crank shaft journaled in the sub-platform, two rods connected to the walking beam, one upon each side of the fulcruming point thereof and to the crank of the crank shaft, a counter shaft journaled in the sub-platform and operably connected to the crank shaft, and a hand operated clutch mounted upon the counter shaft for connecting the counter shaft with the drive axle.

3. In a hand car, the combination with an open rectangular frame, a pair of axles and wheels supporting the frame, a gear keyed upon one of the axles, of another open frame mounted fixedly to and within the first open frame and attached thereto, and power mechanism carried by the second open frame for operating the gear of one of the axles.

4. In a hand car, the combination with an open rectangular frame, a pair of axles and wheels supporting the frame, a gear keyed upon one of the axles, of another open frame mounted within the first open frame and attached thereto, two posts carried by the last open frame, a walking beam mounted for reciprocation in the upper ends of said posts, a shaft provided with two cranks journaled in the open frame at the lower end of the posts, two links connected to the walking beam and the respective cranks of the shaft, a counter shaft journaled in the last open frame, a gearing carried by the crank shaft and counter shaft for transmitting power from the crank to the counter shaft, a gear mounted upon the counter shaft and connected with the gear of the axle, and a manually operated clutch mounted upon the counter shaft and carried by the gear thereof for connecting the counter shaft with the gear of the axle.

5. In a hand car, the combination with an open rectangular frame, a pair of axles and wheels supporting the frame, a gear keyed upon one of the axles, of another open frame mounted within the first open frame and attached thereto, two posts carried by the last open frame, a walking beam mounted for reciprocation in the upper ends of said posts, a shaft provided with two cranks journaled in the open frame at the lower end of the posts, two links connected to the walking beam and the respective cranks of the shaft, a counter shaft journaled in the last open frame, a gearing carried by the crank shaft and counter shaft for transmitting power from the crank shaft to the counter shaft, a gear mounted upon the counter shaft and connected with the gear of the axle, a manually operated clutch mounted upon the counter shaft and carried by the gear thereof for connecting the counter shaft with the gear of the axle, and a balance wheel upon the counter shaft to act as a momentum device in assisting in the rotation of the counter shaft.

In testimony that I claim the foregoing as my own, I have hereto affixed my signature in the presence of two witnesses.

JOHN A. CHAMBERS.

Witnesses:
FRED McCAW,
F. H. GERMANN.

Copies of this patent may be obtained for five cents each, by addressing the "Commissioner of Patents, Washington, D. C."